United States Patent [19]

Nakamura et al.

[11] Patent Number: 5,835,142
[45] Date of Patent: Nov. 10, 1998

[54] DIRECT CONTACT TYPE IMAGE SENSOR AND ITS PRODUCTION METHOD

[75] Inventors: Tetsuro Nakamura, Takarazuka; Masahiro Nakagawa, Osaka; Eiichiro Tanaka, Kishiwada; Shinji Fujiwara, Mino, all of Japan

[73] Assignee: Matsushita Electric Industrial Co., ltd., Kadoma, Japan

[21] Appl. No.: 487,971

[22] Filed: Jun. 7, 1995

Related U.S. Application Data

[63] Continuation of Ser. No. 13,725, Feb. 3, 1993, abandoned.

[30] Foreign Application Priority Data

| Feb. 4, 1992 | [JP] | Japan | 4-018615 |
| Apr. 20, 1992 | [JP] | Japan | 4-099240 |
| Oct. 2, 1992 | [JP] | Japan | 4-264511 |

[51] Int. Cl.⁶ ............................................ H04N 5/225
[52] U.S. Cl. ...................... 348/335; 348/359; 348/374; 250/208.1
[58] Field of Search .................................. 348/374, 335, 348/340, 359, 370; 358/471, 484, 494; 250/208.1; 357/30; 228/179; 355/238; 428/220; H04N 5/225

[56] References Cited

U.S. PATENT DOCUMENTS

| 3,267,555 | 8/1966 | Berger et al. | 355/238 |
| 4,063,360 | 12/1977 | Waller | 433/9 |
| 4,758,464 | 7/1988 | Masuzawa et al. | 428/220 |
| 4,908,718 | 3/1990 | Shimada | 358/494 |
| 4,939,591 | 7/1990 | Itoh et al. | |
| 4,942,481 | 7/1990 | Yoshinouchi et al. | 358/471 |
| 4,977,313 | 12/1990 | Nagata et al. | 250/208.1 |
| 5,004,905 | 4/1991 | Youshinouchi et al. | 250/208.1 |
| 5,017,988 | 5/1991 | Komiyama et al. | 357/30 |
| 5,037,780 | 8/1991 | Fujimoto et al. | 437/212 |
| 5,065,006 | 11/1991 | Nakamura et al. | 250/208.1 |
| 5,172,851 | 12/1992 | Matsushita et al. | 228/179 |

FOREIGN PATENT DOCUMENTS

| 0 294 834 A2 | 6/1988 | European Pat. Off. |
| 0 297 798 A2 | 6/1988 | European Pat. Off. |
| 0 299 704 A1 | 7/1988 | European Pat. Off. |
| 0 328 011 A2 | 2/1989 | European Pat. Off. |

*Primary Examiner*—Wendy R. Garber
*Assistant Examiner*—Tuan V. Ho
*Attorney, Agent, or Firm*—Wenderoth, Lind & Ponack, L.L.P.

[57] ABSTRACT

A direct contact type image sensor includes an optical fiber array plate including a transparent substrate and an optical fiber array and having a lower face brought into close contact with an original document. A semiconductor image sensor chip including a photosensor array is mounted on an upper face of the optical fiber array plate by transparent photo-setting and insulating resin. A circuit conductive layer is formed on an upper face of the transparent substrate, and a bump electrode is formed on a lower face of the semiconductor image sensor chip so as to be brought into contact with the circuit conductive layer. A light source is provided for illuminating the original document. The optical fiber array plate is formed, on the upper face, with a slit for allowing light from the light source to pass therethrough. A first light shielding layer is provided at other portions of the lower face of the optical fiber array plate than that corresponding to the optical fiber array, and a second light shielding layer is provided at other portions of the upper face of the optical fiber array plate than those corresponding to the optical fiber array and the slit.

19 Claims, 11 Drawing Sheets

DIRECT CONTACT TYPE IMAGE SENSOR AND ITS PRODUCTION METHOD

This application is a Continuation of now abandoned application, Ser. No. 08/013,725, filed Feb. 3, 1993.

BACKGROUND OF THE INVENTION

The present invention generally relates to an image sensor which is brought into direct contact with an optical image by using an optical fiber array plate for transmitting one-dimensional optical images or through a transparent film substrate so as to convert the optical image into an electric signal and more particularly, to a direct contact type image sensor suitable for use in a facsimile machine, an image reader, etc., which is brought into close contact with an original document so as to read an image arranged width-wise of the original document.

Figure 1A:
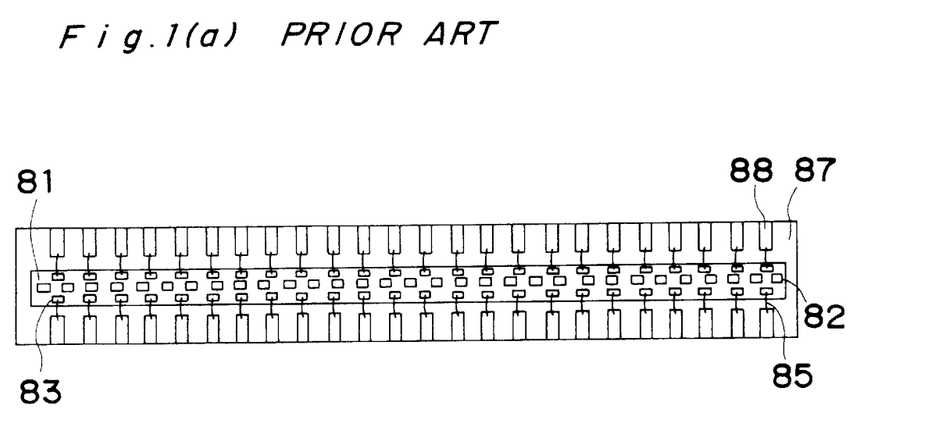
FIGS. 1(a) and 1(b) are a top plan view and a transverse sectional view of a prior art image sensor, respectively (already referred to)
Figure 1B:
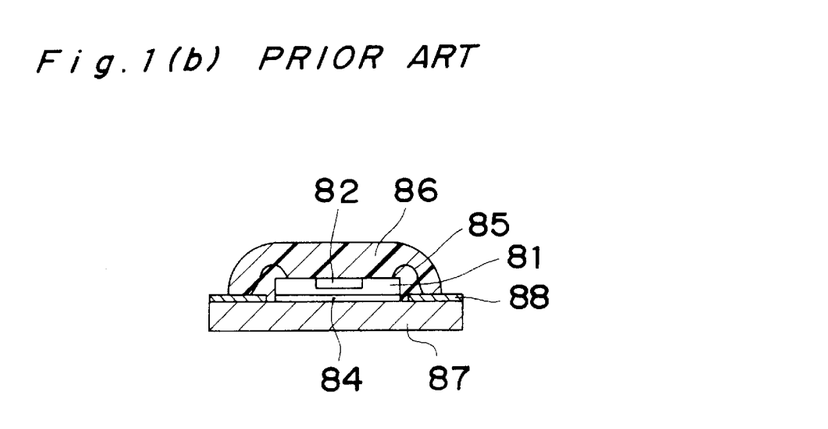

In a known image sensor shown in FIGS. 1(a) and 1(b), a plurality of circuit conductive layers 88 are formed on opposite sides of an opaque substrate 87 so as to confront each other and a semiconductor image sensor chip 81 is attached to the substrate 87 by electrically conductive adhesive 84. A plurality of electrodes 83 are provided at opposite sides of the semiconductor image sensor chip 81. Each of the electrodes 83 of the semiconductor image sensor chip 81 is connected to each of the circuit conductive layers 88 in a wire bonding method by a thin metallic wire 85 made of gold or aluminum. Furthermore, transparent molding resin 86 is used to seal an upper face of the substrate 87. Meanwhile, a photosensor array 82 is provided between the opposed electrodes 83.

However, in the known image sensor, the operation of connecting the electrode 83 and the circuit conductive layer 88 by using the thin metallic wire 85 is quite troublesome and furthermore, it is difficult to reduce a distance between the opposed electrodes 83.

Meanwhile, in prior art image sensors which convert one-dimensional image data into electric signals, a reduced size type one-dimensional image sensor employing one-dimensional charge coupled devices (CCDs) and an equal size type one-dimensional image sensor employing a long sensor equal, in length, to the image are commercially available at present. The prior art equal size type one-dimensional image sensor has such excellent features that rate of utilization of light is high, it is possible to read the image at high speed and an optical system can be so designed as to be made compact. The prior art equal size type one-dimensional image sensor can be divided into a contact type image sensor which employs a convergent lot lens array having equal size optical lenses and a direct contact type image sensor which does not employ the convergent lot lens array. Since the direct contact type image sensor does not employ the covergent lot lens array, the direct contact type image sensor can be produced at low cost and can be made compact easily.

SUMMARY OF THE INVENTION

Accordingly, an essential object of the present invention is to provide an improved direct contact type image sensor employing an optical fiber array plate or a transparent film substrate.

To this end, a direct contact type image sensor according to the present invention includes a plurality of electrodes formed on a semiconductor image sensor chip and a plurality of circuit conductive layers provided on an optical fiber array plate such that each of the electrodes is brought into direct contact with each of the circuit conductive layers. Furthermore, the semiconductor image sensor chip is mounted on one face of the optical fiber array plate by using transparent photo-setting and insulating resin.

By this arrangement of the image sensor, photosensors can be arranged highly accurately. Meanwhile, on the other face of the optical fiber array plate, which comes into close contact with an original document, a transparent resinous layer having wear-resistant properties is provided so as to be brought into direct contact with the original document such that wear resistance is imparted to the optical fiber array plate.

Furthermore, at portions on the other face of the optical fiber array plate, which do not include optical fibers, a light shielding layer is provided between the optical fiber array plate and the transparent resinous layer. Accordingly, it becomes possible to eliminate unnecessary light (flare) produced by reflection of light of the optical fibers on the other face of the optical fiber array plate, which face is brought into close contact with the original document.

Meanwhile, when a transparent film substrate is employed by eliminating the optical fiber array plate, not only the image sensor can be made thinner and produced at low cost but optical transmission efficiency is also raised. Each of a plurality of electrodes formed on the semiconductor image sensor chip is brought into direct contact with each of a plurality of circuit conductive layers provided on the transparent film substrate. Meanwhile, the semiconductor image sensor chip is mounted on the transparent film substrate by using transparent photo-setting and insulating resin. By this arrangement of the image sensor, photosensors can be arranged highly accurately. Meanwhile, on one face of the transparent film substrate, which is brought into close contact with an original document, a transparent resinous layer having wear-resistant properties is provided so as to be brought into direct contact with the original document such that wear resistance is imparted to the transparent film substrate.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 2:
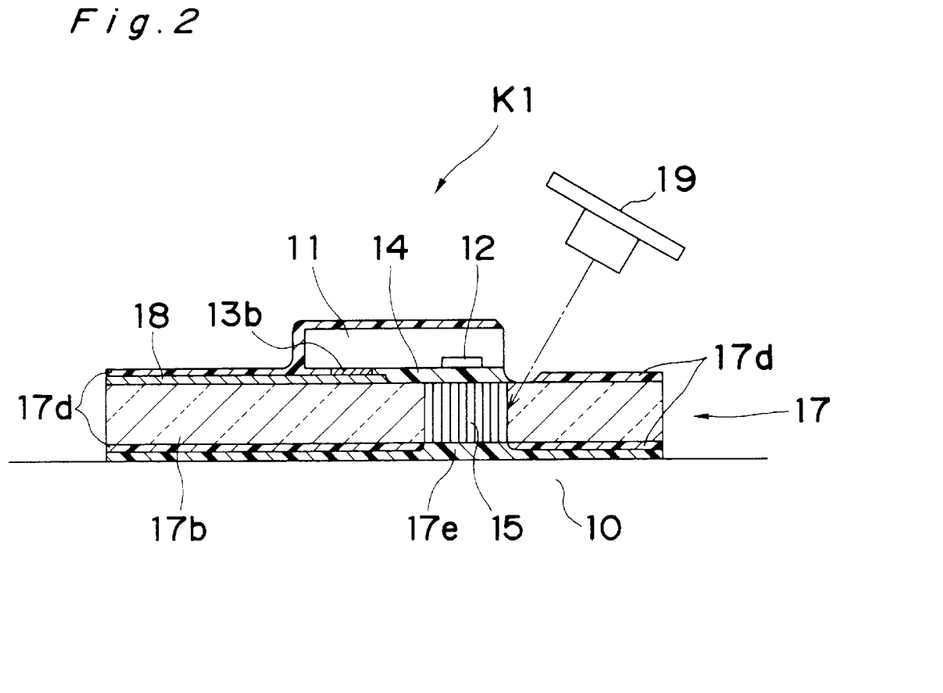
FIG. 2 is a transverse sectional view of an image sensor according to a first embodiment of the present invention.

Referring now to the drawings, there is shown in FIG. 2, a direct contact type image sensor K1 employing an optical fiber array plate 17, according to a first embodiment of the present invention. The optical fiber array plate 17 includes a transparent substrate 17b, an optical fiber array 15, light shielding layers 17d formed on upper and lower faces of the transparent substrate 17b and a transparent resinous layer 17e formed on the lower face of the transparent substrate 17b such that the transparent resinous layer 17e is brought into close contact with an original document 10.

The image sensor K1 further includes a semiconductor image sensor chip 11, a photosensor array 12 formed on a lower face of the semiconductor image sensor chip 11, a bump electrode 13b provided on the lower face of the semiconductor image sensor chip 11, a circuit conductive layer 18 formed on the upper face of the transparent substrate 17b, a light emitting diode (LED) array 19 for illuminating the original document 10 and transparent photo-setting and insulating resin 14 for mounting the semiconductor image sensor chip 11 on the transparent substrate 17b.

By using a semiconductor process, the photosensor array 12 such as a phototransistor, a photodiode, etc. and an access circuit (not shown) such as a CCD, a MOS IC, a bipolar IC, etc. are provided on a single-crystal silicon substrate (wafer). In order to produce each bump electrode 13b, a bump is formed with a wire bonder by using a golden wire so as to project through 10 plus several μm to 60 μm approximately from the upper face of the wafer. Subsequently, the wafer is subjected to operational checkup and then, is cut by high precision dicing. Thus, the semiconductor image sensor chip 11 is obtained.

Figure 3:
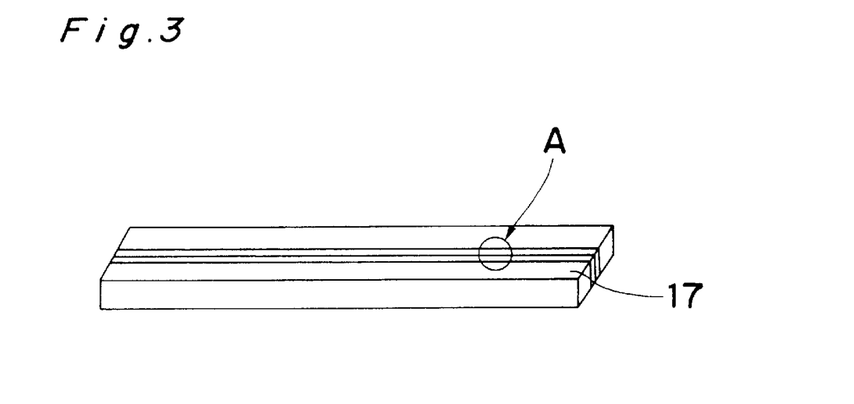
FIG. 3 is a perspective view of an optical fiber array plate employed in the image sensor of FIG. 2.
Figure 4:
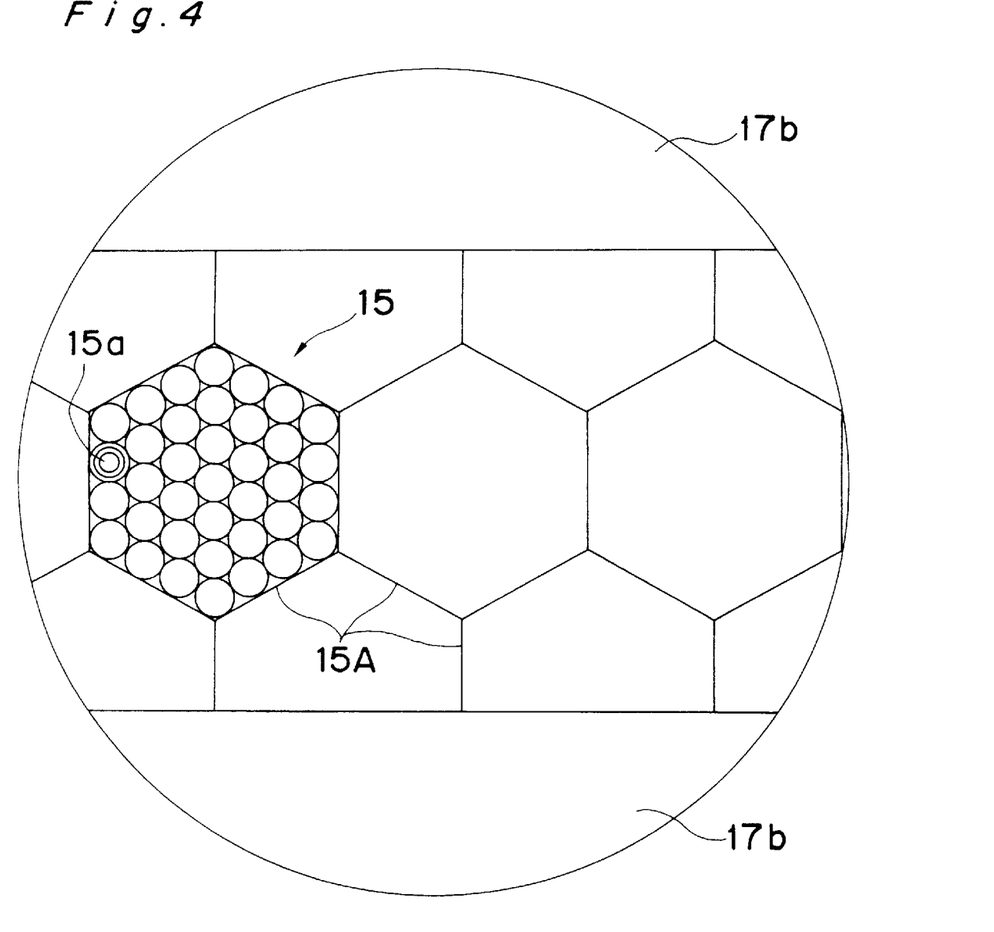
FIG. 4 is an enlarged view of an encircled portion A in FIG. 3, particularly showing an optical fiber array.
Figure 5:
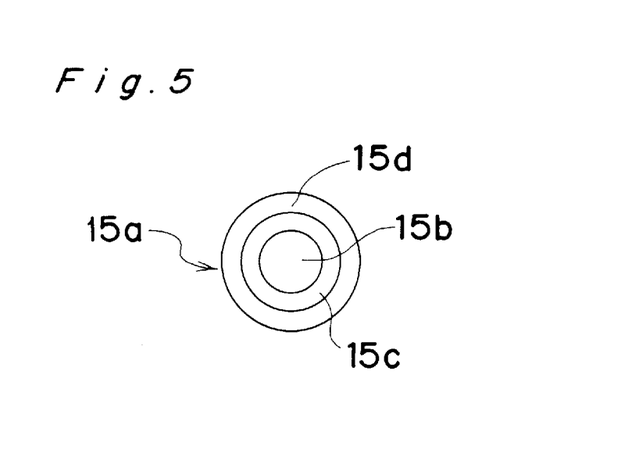
FIG. 5 is an enlarged view of one of optical fibers of the optical fiber array of FIG. 4.

As shown in FIGS. 3 to 5, the optical fiber array plate 17 includes the optical fiber array 15 and the transparent substrate 17b. The optical fiber array 15 includes a plurality of hexagonal fiber bundles 15A arranged linearly successively between two glass plates constituting the transparent substrate 17b. Each of the fiber bundles 15A has a number of optical fibers 15a. As shown in FIG. 5, each of the optical fibers 15a includes a core 15b, a clad 15c surrounding the core 15b and an optical absorber 15d coated around the clad 15c.

After the fiber bundles 15A have been gripped between the two glass plates of the transparent substrate 17b, the glass plates are subjected to heat approximately corresponding to a melting point of glass while being pressed against each other from opposite ends of the optical fiber array plate 17, whereby the optical fiber array plate 17 is produced. Subsequently, by using noble metal such as Au, Ag-Pt, etc., the circuit conductive layer 18 is formed on the upper face of one end portion of the transparent substrate 17b by either screen printing method or thin film forming method and photolithography. Thereafter, by using so-called face-down bonding in which the photosensor array 12 is brought into close contact with the optical fiber array 15, the semiconductor image sensor chip 11 produced as described above is mounted on the transparent substrate 17b through the transparent photo-setting and insulating resin 14 of acrylate type such that the bump electrode 13b is connected to a predetermined location of the circuit conductive layer 18.

Furthermore, at other portions of the opposite faces of the transparent glass substrate 17b than those through which illuminating light passes, the black light shielding layers 17d having a refractive index of 1.52 equal to that of the glass substrate 17b are formed to a thickness of about 60 μm by screen printing method. Finally, on the lower face of the optical fiber array plate 17, which confronts the original document 10, the transparent resinous layer 17e having a refractive index of 1.6 equal to that of the core 15b of the optical fiber 15a is applied to a thickness of about 60 μm by screen printing method. Transparent resinous layer 17e and at least the lower light shielding layer 17d have a pencil lead hardness of not less than 3 H. When, for example, epoxy resin having a pencil lead hardness of about 7 H and sufficient wear resistance against the original document 10 is used for the light shielding layers 17d and the transparent resinous layer 17e, no deterioration in image quality is found after 30,000 original documents 10 have been passed through the transparent resinous layer 17e by pressing the original document 10 against the transparent resinous layer 17e at a load of 2 kg.

By using the image sensor K1, the original document 10 is brought into close contact with the lower face of the image sensor K1 and light from the LED array 19 acting as a light source is incident upon a region of the upper face of the transparent substrate 17b, in which the black light shielding layer 17d is not formed, so as to illuminate the original document 10 through the optical absorber 15d and the clad 15b of the optical fiber 15a. At this time, in order to allow light to pass through the optical absorber 15d of the optical fiber 15a to some extent, the optical absorber 15d has a transmittance of about 20%. Since the light shielding layers 17d and the transparent resinous layer 17e are provided on the optical fiber array plate 17, it becomes possible to eliminate unnecessary light (flare) produced by reflection of light of the LED array 19 on the lower faces of the transparent substrate 17b and the optical fiber array 15. Optical data from the original document 10 is fed to the photosensor array 12 by the optical fiber array 15 in a relationship of one to one without optical crosstalk. As a result, when the photosensor array 12 is of 8 dots/mm, the image sensor K1 enables reading of high resolution in which a modulation transfer function (MTF) has a value of 60% for a chart having 4 line pairs/mm.

Figure 6:
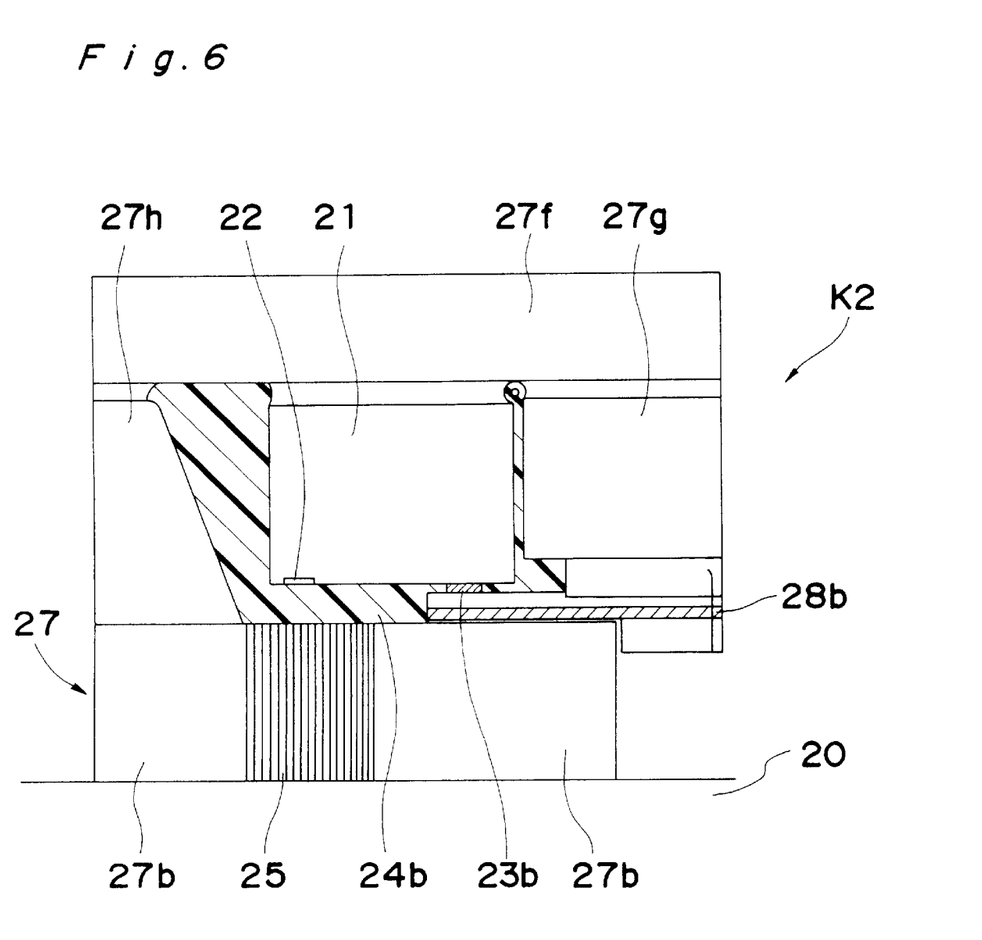
FIG. 6 is a transverse sectional view of an image sensor according to a second embodiment of the present invention.

FIG. 6 shows an image sensor K2 employing an optical fiber array plate 27, according to a second embodiment of the present invention. The optical fiber array plate 27 includes an opaque glass substrate 27b and an optical fiber array 25. The opaque glass substrate 27b may be formed by colored glass such as ND filter material, brown glass used for a glass window or optical color glass. Alternatively, the opaque glass substrate 27b may be formed by crystalline glass having less reflection.

In the image sensor K2, a semiconductor image sensor chip 21 provided with a photosensor array 22 is die bonded to a translucent carrier 27f by using adhesive (not shown). A bump electrode 23b is formed on the semiconductor image sensor chip 21 and confronts an electrode formed on a flexible circuit conductive substrate 28b so as to be connected thereto. The flexible circuit conductive substrate 28b is secured to the translucent carrier 27f by a carrier 27g. The opaque glass substrate 27b of the optical fiber array plate 27 is made of light absorbing material and the optical fiber array plate 27 is fixed to a carrier 27h and the semiconductor image sensor chip 21 by translucent resin 24b.

A glass substrate is used as the translucent carrier 27f. A preset amount of thermosetting adhesive or photo-setting resin is applied to the translucent carrier 27f by stamping method or screen printing method and then, the semiconductor image sensor chip 21 is mounted on the translucent carrier 27f. Thereafter, by irradiating light to the assembly or heating the assembly, the photo-setting resin or the thermosetting adhesive is set and thus, mounting of the semiconductor image sensor chip 21 on the translucent carrier 27f is completed. Subsequently, the carrier 27g to which the flexible circuit conductive substrate 28b is beforehand attached by adhesive or the like is placed such that the soldered or gold-plated electrode of the flexible circuit conductive substrate 28b is brought into contact with the bump electrode 23b of the semiconductor image sensor chip 21. Then, the flexible circuit conductive substrate 28b and the carrier 27g are secured in position. Thereafter, by pressing the bump electrode 23b of the semiconductor image sensor chip 21 from above the flexible circuit conductive substrate 28b so as to heat the bump electrode 23b, solder of the electrode of the flexible circuit conductive substrate 28b is fused. Alternatively, gold of the electrode of the flexible circuit conductive substrate 28b is fused by using ultrasonic waves additionally. A flexible printed circuit board (FPC) such as a polyimide film, etc. or a TAB film may be used as the flexible circuit conductive substrate 28b. Then, light absorbing brown glass for a glass window is used as the opaque glass substrate 27b of the optical fiber array plate 27.

Since the optical fiber array plate 27 which is brought into contact with an original document 20 is required to have a high flatness, the optical fiber array plate 27 is secured to the translucent carrier 27f through the carrier 27h and is fixed to the semiconductor image sensor chip 21 through the translucent resin 24b. The translucent resin 24b may be (1) silicone type or acrylic type photo-setting resin, (2) thermosetting resin or (3) resin setting at room temperature.

In the direct contact type image sensor K2, when the face of the original document 20 is illuminated by using a LED identical with that of a known direct contact type image sensor employing a SELFOC (brand name of Nippon Sheet Glass Company Limited of Japan) lens array, an optical signal output whose strength is about twice that of the known image sensor can be obtained. Furthermore, in the image sensor K2, when resolution characteristics are measured by using a chart having 4 line pairs/mm, an MTF having a value of about 60% or more can be obtained.

Figure 7:
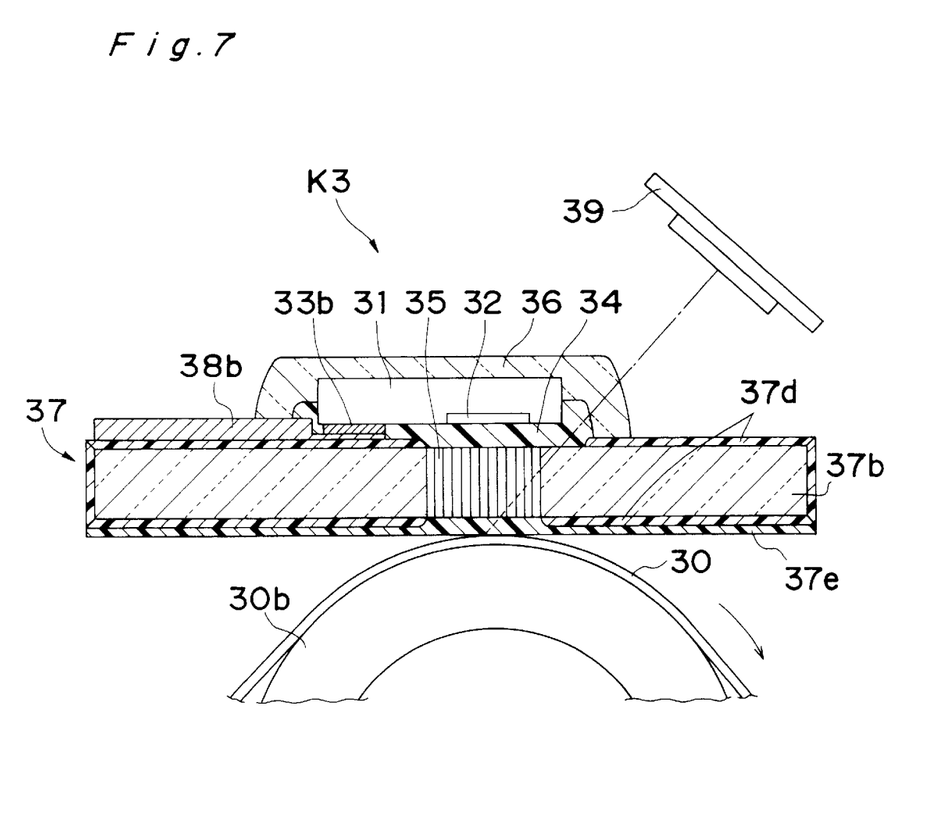
FIG. 7 is a transverse sectional view of an image sensor according to a third embodiment of the present invention.

FIG. 7 shows a direct contact type image sensor K3 employing an optical fiber array plate 37, according to a third embodiment of the present invention. The optical fiber array plate 37 includes a transparent substrate 37b and an optical fiber array 35. After the optical fiber array 35 has been fused to the transparent substrate 37b, the assembly is cut to a thickness of about 1 mm and then, is ground flat on the surface, whereby the optical fiber array plate 37 is obtained. The image sensor K3 includes a flexible circuit conductive substrate (flexible printed circuit board) 38b having a circuit conductive layer and attached to the upper face of the transparent substrate 37b, a semiconductor image sensor chip 31, a photosensor array 32 provided in the semiconductor image sensor chip 31, a bump electrode 33b provided on the semiconductor image sensor chip 31, transparent photo-setting and insulating resin 34 for mounting the semiconductor image sensor chip 31 on the transparent substrate 37b and a transparent protective layer 36 for protecting the semiconductor image senor chip 31. The bump electrode 33b is formed by a ball bump of gold or solder.

A slit is formed on the upper face of the transparent substrate 37b so as to allow light from a light source 39 to pass therethrough. Light shielding layers 37d are provided not only at portions on the lower face of the transparent substrate 37b, which deviate from the optical fiber array 35 but at portions on the upper face of the transparent substrate 37b, which deviate from the above mentioned slit and the optical fiber array 35. Furthermore, the light shielding layers 37d are provided on all side faces of the transparent substrate 37b. The optical fiber array 35 is bonded to the transparent substrate 37b by transparent photo-setting and insulating resin or the like. Meanwhile, a transparent resinous layer 37e is provided on the whole lower face of the transparent substrate 37b. An original document 30 to be read is illuminated by the light source (LED array) 39 and is carried to a read-out position of a reader by a transport roller 30b.

By using noble metal such as Au, Ag-Pt, etc., the flexible circuit conductive substrate (flexible printed circuit board) 38b includes two circuit conductive layers each having a thickness of 35 $\mu$m or less by thin film forming method and photolithography. A macromolecular film having a thickness of not more than 200 $\mu$m, desirably, 30 to 100 $\mu$m may be suitably used each of the circuit conductive layers. In this embodiment, a macromolecular film, for example, a polyimide or polyester film having a thickness of 12.5 to 25 $\mu$m is used as each of a base film and a cover film. Meanwhile, by using Au, Ag-Pt, Cu, Sn, eutectic solder or low-temperature solder such as Sn-In, Sn-Pb-Bi, Sn-Pb-In, etc., an electrode of the flexible circuit conductive substrate 38b is formed to a height of not more than 50 $\mu$m, desirably, 2 to 20 $\mu$m by solder coating, electrolytic plating or the like. Then, the black light shielding layers 37d are formed on the transparent glass substrate 37b by screen printing method. However, the light shielding layers 37d are not formed at portions of the transparent substrate 37b, to which the optical fiber array 35 is bonded and through which illuminating light from the light source 39 passes. Subsequently, the transparent resinous layer 37e such as wear-resistant phenol resin, epoxy resin, urethane acrylate, silicone resin, etc. is formed on the whole lower face of the transparent substrate 37b.

After the optical fiber array plate 37 has been produced in which the optical fiber array 35 is fused to opposite inner side faces and opposite inner end faces of the transparent substrate 37b, the flexible circuit conductive substrate 38b is bonded to the transparent substrate 37b of the optical fiber array plate 37 with transparent insulating resin such as phenol epxoy resin, epoxy resin, etc. by using a press so as to extend flat relative to the transparent substrate 37b without being curved. After setting, this transparent insulating resin desirably has a thickness of not more than 50 $\mu$m, preferably, 10 to 25 $\mu$m. After the flexible circuit conductive substrate 38b has been bonded to the transparent substrate 37b flat, the bump electrode 33b of the semiconductor image sensor chip 31 is mounted by using the transparent photo-setting and insulating resin 34 so as to be connected to a predetermined position of the electrode of the flexible circuit conductive substrate 38b. Then, in order to securely connect the bump electrode 33b and the electrode of the flexible circuit conductive substrate 38b through fusion of solder of the bump electrode 33b, the semiconductor image sensor chip 31 is heat treated at 170° to 200° C. Furthermore, in order to protect the semiconductor image sensor chip 31 on the optical fiber array plate 37, in which the photosensor array 32 including a number of square photosensors of 50 to 100 μm in size are arranged in parallel at an interval of 62.5 μm or 125 μm, the semiconductor image sensor chip 31 is coated with the transparent protective layer 36 such as silicone resin, etc.

By using the direct contact type image sensor K3 of the above described arrangement, the original document 30 is brought into close contact with the lower face of the optical fiber array 35, while light from the light source 39 is incident upon the upper face of the transparent substrate 37b and is passed through the transparent substrate 37b so as to illuminate the original document 30 through the optical fiber array 35 and the transparent resinous layer 37e. Optical data from the original document is fed to the photosensor array 32 by the optical fiber array 35 in a relationship of one to one without optical crosstalk. Unnecessary external light is completely intercepted by the black light shielding layers 37d. Meanwhile, since the wear-resistant transparent resinous layer 37e is provided on the whole lower face of the optical fiber array plate 37, no deterioration in image quality is found after 30,000 original documents 30 have been passed through the transparent resinous layer 37e by pressing the original document 30 against the transparent resinous layer 37e at a load of 2 kg. As a result, in the image sensor K3, an image can be read at high resolution in which an MTF has a value of about 60% for a chart having 4 line pairs/mm.

Figure 8:
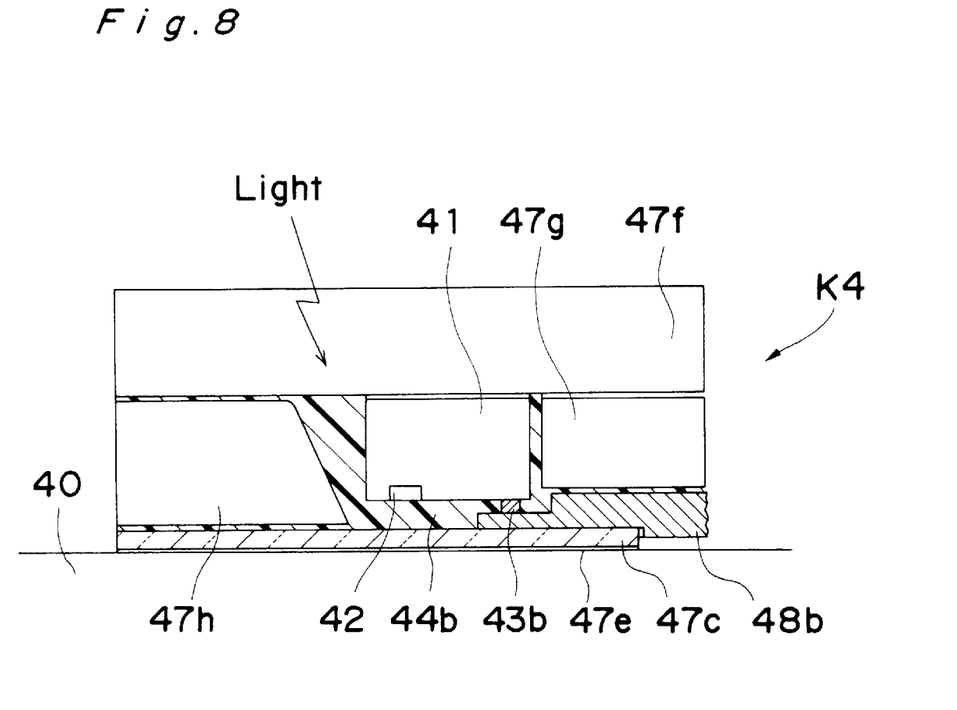
FIG. 8 is a transverse sectional view of an image sensor according to a fourth embodiment of the present invention.

FIG. 8 shows a direct contact type image sensor K4 employing a transparent film substrate 47c, according to a fourth embodiment of the present invention. In the image sensor X4, a semiconductor image sensor chip 41 having a photosensor array 42 is die bonded to a translucent carrier 47f by adhesive (not shown). A bump electrode 43b is formed on the semiconductor image sensor chip 41 and confronts an electrode formed on a flexible circuit conductive substrate 48b so as to be connected thereto. The flexible circuit conductive substrate 48b is secured to the translucent carrier 47f by a carrier 47g. The transparent film substrate 47c is formed with a transparent conductive layer 47e and is secured to a carrier 47h and the semiconductor image sensor chip 41 by transparent resin 44b.

A glass substrate is used as the translucent carrier 47f. A preset amount of thermosetting adhesive or photo-setting resin is applied to the translucent carrier 47f by stamping method or screen printing method and then, the semiconductor image sensor chip 41 is mounted on the translucent carrier 47f. Thereafter, by irradiating light to the assembly or heating the assembly, the photo-setting resin or the thermosetting adhesive is set and thus, mounting of the semiconductor image sensor chip 41 on the translucent carrier 47f is completed. Subsequently, the carrier 47g to which the flexible circuit conductive substrate 48b is beforehand attached by adhesive or the like is placed such that the soldered or gold-plated electrode of the flexible circuit conductive substrate 48b is brought into contact with the bump electrode 43b of the semiconductor image sensor chip 41. Then, the flexible circuit conductive substrate 48b and the carrier 47g are secured in position. Thereafter, by pressing the bump electrode 43b of the semiconductor image sensor chip 41 from above the flexible circuit conductive substrate 48b so as to heat the bump electrode 43b, solder of the electrode of the flexible circuit conductive substrate 48b is fused. Alternatively, gold of the electrode of the flexible circuit conductive substrate 48b is fused by using ultrasonic waves additionally. A flexible printed circuit board (FPC) such as a polyimide film, etc. or a TAB film may be used as the flexible circuit conductive substrate 48b.

Then, a thin glass sheet of about 50 μm in thickness on which a transparent electrode is formed as the transparent conductive layer 47e may be used as the transparent film substrate 47c. Since the transparent film substrate 47c which is brought into contact with an original document 40 is required to have a high flatness, the transparent film substrate 47c is secured to the translucent carrier 47f through the carrier 47h and is fixed to the semiconductor image sensor chip 41 through the transparent resin 44b. The transparent resin 44b may be (a) silicone type or acrylic type photo-setting resin, (b) thermosetting resin or (c) resin setting at room temperature.

In the direct contact type image sensor K4, when the face of the original document 40 is illuminated by using a LED identical with that of a known direct contact type image sensor employing a SELFOC lens array, an optical signal output whose strength is about twice that of the known image sensor can be obtained. Furthermore, in the image sensor K4, when resolution characteristics are measured by using a chart having 4 line pairs/mm, an MTF having a value of about 50% or more can be obtained. Meanwhile, even if 30,000 original documents 40 are passed through the transparent resinous layer 47e by pressing the original document 40 against the transparent resinous layer 47e at a load of 0.5 kg, no deterioration in image quality is found.

Figure 9:
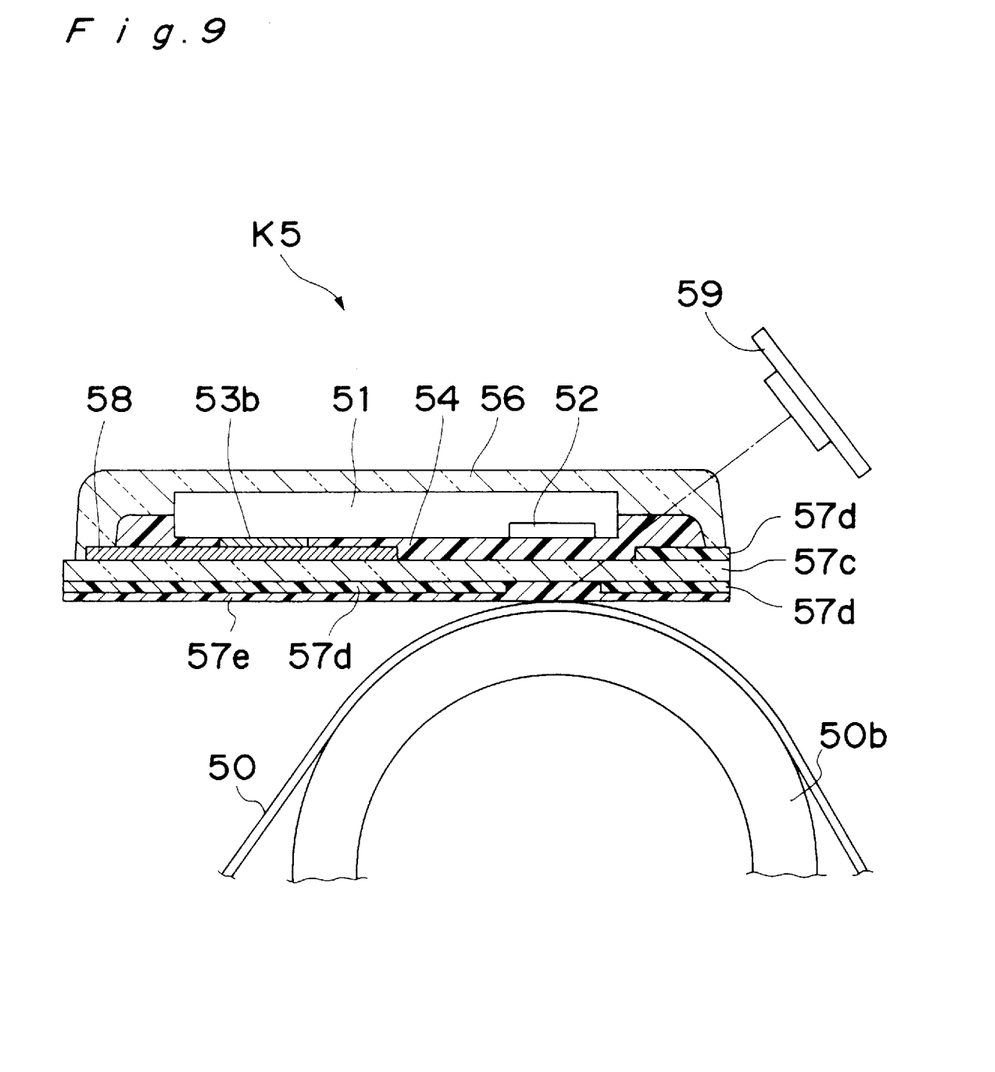
FIG. 9 is a transverse sectional view of an image sensor according to a fifth embodiment of the present invention.

FIG. 9 shows a direct contact type image sensor K5 employing a transparent film substrate 57c, according to a fifth embodiment of the present invention. The image sensor K5 includes a circuit conductive layer 58 formed on the upper face of the transparent film substrate 57c, a semiconductor image sensor chip 51 acting as a semiconductor device, a bump electrode 53b provided on the semiconductor image sensor chip 51, transparent photo-setting and insulating resin 54 for mounting the semiconductor image sensor chip 51 on the transparent film substrate 57c, a transparent protective layer 56 for protecting the semiconductor image sensor chip 51, a photosensor array 52 provided in the semiconductor image sensor chip 51, light shielding layers or conductive light shielding layers 57d and a transparent resinous layer or a conductive transparent resinous layer 57e formed on the whole lower face of the transparent film substrate 57c.

A slit is formed on the upper face of the transparent film substrate 57c so as to allow light from a light source 59 to pass therethrough. The conductive light shielding layers 57d are provided not only at portions on the lower face of the transparent film substrate 57c, which deviate from the photosensor array 52 but at portions on the upper face of the transparent film substrate 57c, which deviate from the photosensor array 52 and the slit referred to above. An original document 50 to be read is illuminated by the light source (LED array) 59 and is carried to a read-out position of a reader by a conductive transport roller 50b.

The transparent film substrate 57c has a thickness of 25 to 200 μm and is formed by a sheet of polyallylate (PA), polyether sulfone (PES), polyethylene terephthalate (PET) or glass. Metal such as gold, copper or the like is formed on the upper face of the transparent film substrate 57c to a thickness of 2 to 20 μm by deposition method or sputtering method or by using a foil and then, is subjected to photolithography. As a result, the circuit conductive layer 58 is obtained. A preset amount of the acrylate type transparent photo-setting and insulating resin 54 is applied to a predetermined location of the transparent film substrate 57c by stamping method or screen printing method. Then, the semiconductor image sensor chip 51 is placed in face-down orientation such that the bump electrode 53b is brought into contact with the corresponding circuit conductive layer 58. Subsequently, while a predetermined pressure is being applied to the semiconductor image sensor chip 51 from above, light is irradiated to the transparent photo-setting and insulating resin 54 through the transparent film substrate 57c so as to set the transparent photo-setting and insulating resin 54. Thereafter, by applying resin, e.g., transparent silicone resin to the semiconductor image sensor chip 51 with a dispenser, the transparent protective layer 56 is formed.

In the image sensor K5, the conductive transparent resinous layer 57e provided on the lower face of the transparent film substrate 57c is brought into close contact with the original document 50. The original document 50 is illuminated by the LED array 59 through the transparent protective layer 56, the transparent photo-setting and insulating resin 54, the transparent film substrate 57c and the conductive transparent resinous layer 57e. Optical data from the original document 50 is directly fed to the photosensor array 52 through the conductive transparent resinous layer 57e, the transparent film substrate 57c and the transparent photo-setting and insulating resin 54.

The conductive transport roller 50b is made of electrically conductive rubber in which conductivity imparting substance such as carbon black, acetylene black, zinc oxide or tin oxide having a sheet resistance of not more than $10^5$ Ω/□ is mixed with elastomer base material such as polyurethane, silicone rubber, etc. By connecting the conductive transport roller 50b and metal portions of the image sensor K5 to ground, static electricity produced through contact of the original document 50 with them can be eliminated and noises can be reduced.

From a standpoint of bonding property and optical sensitivity, it is desirable that the transparent photo-setting and insulating resin 54 for mounting the semiconductor image sensor chip 51 on the transparent film substrate 57c be made of urethane acrylate type resin or epoxy acrylate type resin. Meanwhile, the transparent film substrate 57c has a thickness of about 20 to 200 μm and may be formed by a thin film made of polyether sulfone (PES) or polyallylate (PA). The conductive light shielding layers 57d have a thickness of about 5 to 50 μm and may be formed by mixing into phenol resin or urethane allylate resin, conductive particles of carbon black, indium oxide or tin oxide having a sheet resistance of not more than $10^7$ Ω/□. In order to impart resistance against static electricity and wear resistance to the conductive transparent resinous layer 57e, the conductive transparent resinous layer 57e has a thickness of about 10 to 100 μm and may be formed by mixing into transparent allylate resin, conductive particles of palladium, indium oxide or tin oxide.

When the upper light shielding layer 57d, the transparent film substrate 57c, the lower light shielding layer 57d and the conductive transparent resinous layer 57e have a total thickness of 25 to 200 μm, not only optical data from the original document 50 can be read without the need for providing a lens system and without optical crosstalk at high resolution in which an MTF has a value of 50% for a chart having 4 line pairs/mm but the image sensor K5 itself can be remarkably reduced in size.

Meanwhile, the conductive light shielding layers 57d provided on the lower face of the transparent film substrate 57c is brought into contact with the original document 50 and is grounded. As a result, resistance against static electricity and wear resistance of the image sensor K5 are improved. Furthermore, even if 30,000 original documents 50 are passed through the conductive light shielding layers 57d while being pressed against the conductive light shielding layers 57d at a load of 0.5 kg, no deterioration in image quality is found.

When images are read by the image sensor K5, signal-to-noise ratio, resolution and optical transmission efficiency are maintained at high levels and noises can be reduced. Images can be read by the image sensor K5 quite easily, compactly and at low cost. Furthermore, optical transmission efficiency of the image sensor K5 is 4 to 5 times that of a known arrangement employing a lens system, thereby resulting in reduction of cost of the light source 59.

Figure 10:
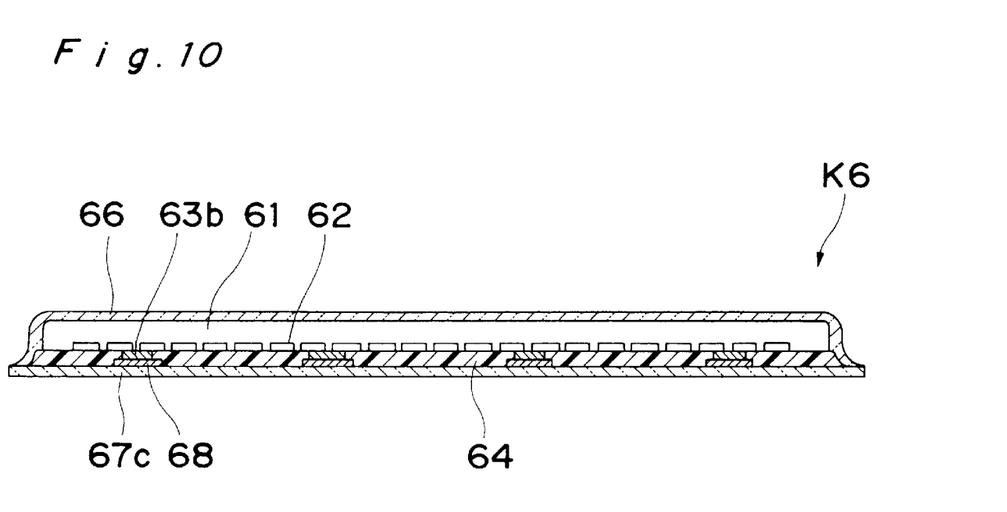
FIG. 10 is a longitudinal sectional view of an image sensor according to a sixth embodiment of the present invention.
Figure 11:
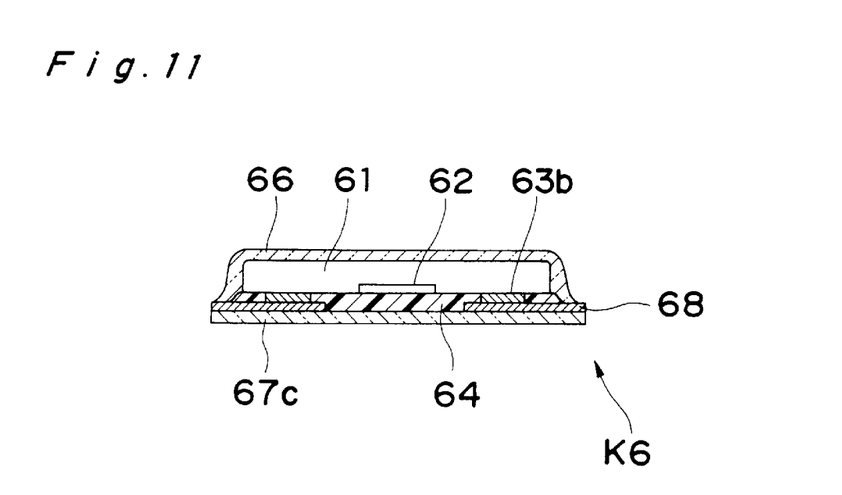
FIG. 11 is a transverse sectional view of the image sensor of FIG. 10.

FIGS. 10 and 11 show a direct contact type image sensor K6 employing a transparent film substrate 67c, according to a sixth embodiment of the present invention. The image sensor K6 includes circuit conductive layers 68 formed on the upper face of the transparent film substrate 67c, a semiconductor image sensor chip 61 acting as a semiconductor device, bump electrodes 63b provided on the semiconductor image sensor chip 61, a transparent photo-setting and insulating resin 64 for mounting the semiconductor image sensor chip 61 on the transparent film substrate 67c, a transparent protective layer 66 for protecting the semiconductor image sensor chip 61 and a photosensor array 62 provided in the semiconductor image sensor chip 61. A portion 68b of each of the circuit conductive layers 68 is brought into contact with the corresponding bump electrode 63b and may have a latticed shape and a forked shape as shown in FIGS. 12(a) and 12(b), respectively.

On the upper face of the transparent film substrate 67c made of polyallylate (PA), polyether sulfone (PES), polyethylene terephthalate (PET), etc., metal such as copper is formed by deposition method or sputtering method or by using a foil and then, is subjected to photolithography. As a result, the circuit conductive layers 68 are obtained. A preset amount of the acrylate type transparent photo-setting and insulating resin 64 is applied to a predetermined location of the transparent film substrate 67c by stamping method or screen printing method. Then, the semiconductor image sensor chip 61 is placed in face-down orientation such that the bump electrode 63b is brought into contact with the corresponding circuit conductive layer 68. Subsequently, while a predetermined pressure is being applied to the semiconductor image sensor chip 61 from above, light is irradiated to the transparent photo-setting and insulating resin 64 through the transparent film substrate 67c so as to set the transparent photo-setting and insulating resin 64. Thereafter, by applying resin, e.g., silicone resin to the semiconductor image sensor chip 61, etc. with a dispenser, the transparent protective layer 66 is formed.

In the image sensor K6, optical data is detected by the photosensor array 62 via the transparent film substrate 67c and the transparent photo-setting and insulating resin 64 so as to be converted into electric signals. From a standpoint of bonding property and optical sensitivity, it is desirable that the transparent photo-setting and insulating resin 64 be made of urethane acrylate type resin or epoxy acrylate type resin.

Figure 12A:
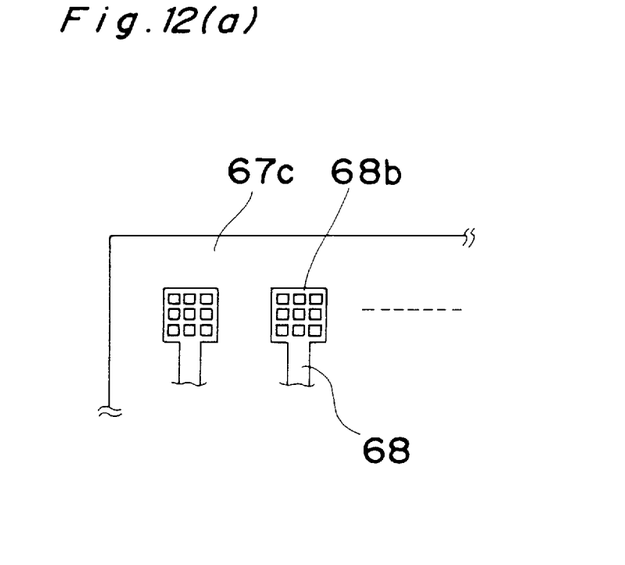
FIGS. 12(a) and 12(b) are top plan views showing different shapes of a circuit conductive layer employed in the image sensor of FIG. 10.
Figure 12B:
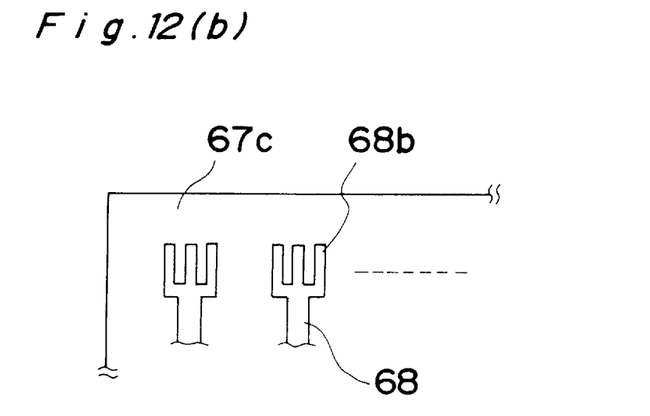

If the circuit conductive layer 68 is formed as shown in FIG. 12(a) or 12(b), the transparent photo-setting and insulating resin 64 covered by the circuit conductive layers 68 is set securely and electrical connection of the semiconductor image sensor chip 61 is improved. As a result, the image sensor K6 is resistant against combination of a high temperature of 85° C. and a high humidity of 85%, a high temperature of 85° C., a low temperature of −40° C. and thermal shocks ranging from −40° C. to 85° C. and thus, has high reliability sufficient for practical use.

Figure 13:
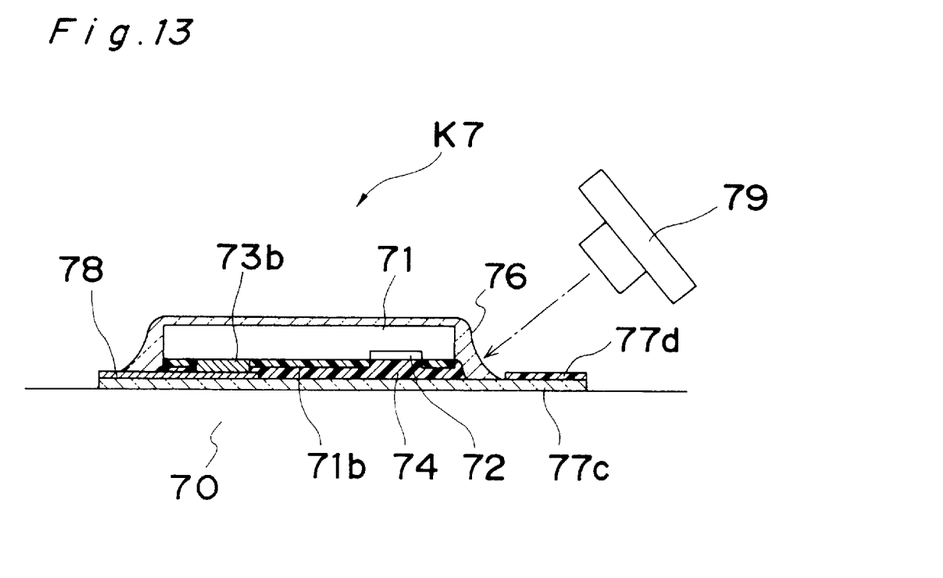
FIG. 13 is a transverse sectional view of an image sensor according to a seventh embodiment of the present invention.
Figure 14:
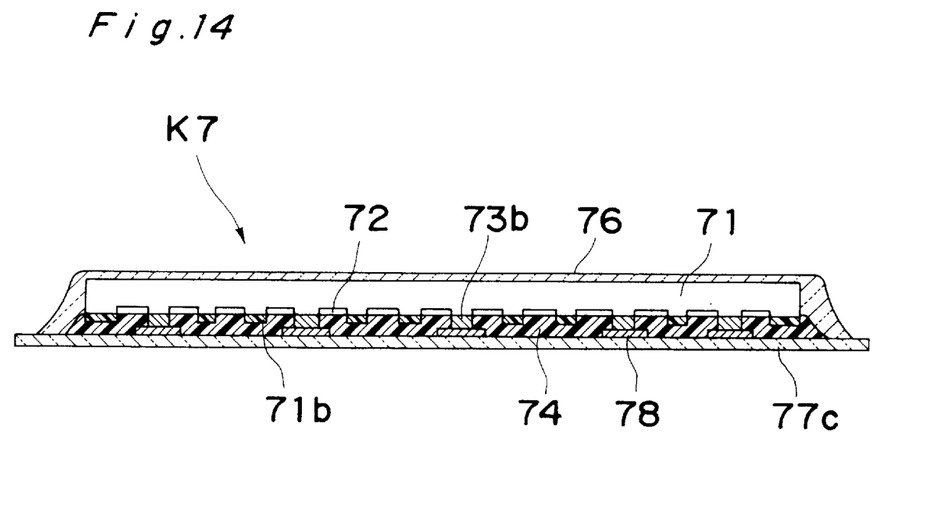
FIG. 14 is a longitudinal sectional view of the image sensor of FIG. 13.
Figure 15:
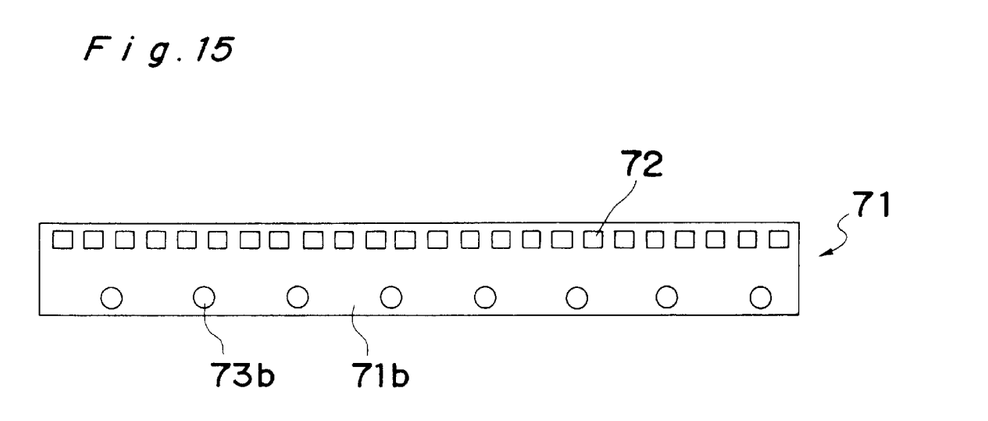
FIG. 15 is a top plan view of a semiconductor image sensor chip employed in the image sensor of FIG. 13.
Figure 16:
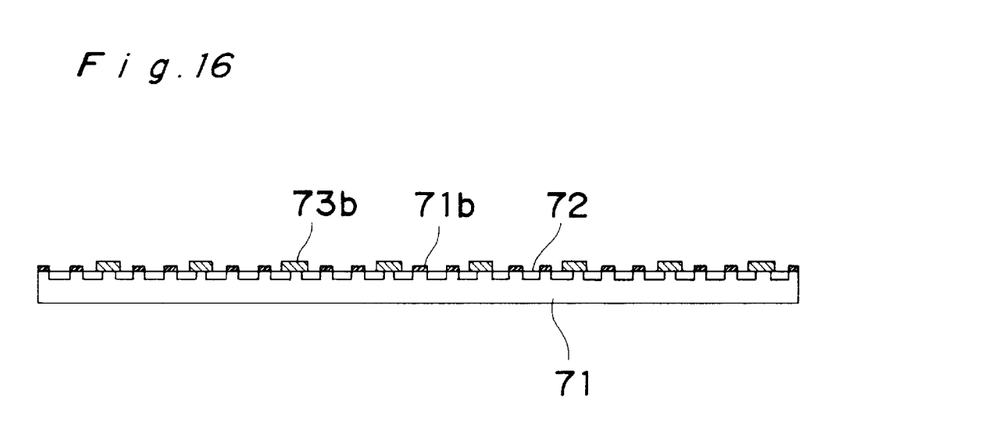
FIG. 16 is a longitudinal sectional view of the semiconductor image sensor chip of FIG. 15.

FIGS. 13 and 14 show an image sensor K7 employing a transparent film substrate 77c, according to a seventh embodiment of the present invention. The image sensor K7 includes a circuit conductive layer 78 formed on the upper face of the transparent film substrate 77c, a semiconductor image sensor chip 71, a bump electrode 73b provided on the semiconductor image sensor chip 71, transparent photo-setting and insulating resin 74 for mounting the semiconductor image sensor chip 71 on the transparent film substrate 77c, a transparent protective layer 76 for protecting the semiconductor image sensor chip 71, a photosensor array 72 provided in the semiconductor image sensor chip 71 and light shielding layers 71b and 77c. FIGS. 15 and 16 show construction of the semiconductor image sensor chip 71. The light shielding layer 71b is provided at portions of the surface of the semiconductor image sensor chip 71 other than the photosensor array 72 and the bump electrode 73b. On the other hand, the light shielding layer 77d is provided on the upper face of the transparent film substrate 77c.

Black epoxy resin is applied to the lower face of the semiconductor image sensor chip 71 by spin coating method. Then, only the applied epoxy resin on the photo-sensor array 72 and the bump electrode 73b is removed and thus, the light shielding layer 71b is formed. By using wire bonding process on an electrode of aluminum, each bump electrode 73b is formed by a ball bump of gold having a height of about 30 μm. Subsequently, this wafer is subjected to operational check up and then, is cut by high precision dicing. Thus, the semiconductor image sensor chip 71 is obtained.

The transparent film substrate 77c has a thickness of 25 to 200 μm and is formed by a sheet of polyallylate (PA), polyether sulfone (PES), polyethylene terephthalate (PET), etc. Metal such as copper or the like is formed on the upper face of the transparent film substrate 77c to a thickness of 2 to 20 μm by deposition method or sputtering method or by using a foil and then, is subjected to photolithography. As a result, the circuit conductive layer 78 is obtained. A preset amount of the acrylate type transparent photo-setting and insulating resin 74 is applied to a predetermined location of the transparent film substrate 77c by stamping method or screen printing method. Then, the semiconductor image sensor chip 71 is placed in face-down orientation such that the bump electrode 73b is brought into contact with the corresponding circuit conductive layer 78. Subsequently, while a predetermined pressure is being applied to the semiconductor image sensor chip 71 from above, light is irradiated to the transparent photo-setting and insulating resin 74 through the transparent film substrate 77c so as to set the transparent photo-setting and insulating resin 74. Thereafter, by applying resin, e.g., transparent silicone resin to the semiconductor image sensor chip 71 with a dispenser, the transparent protective layer 76 is formed. From a standpoint of bonding property and optical sensitivity, it is desirable that the transparent photo-setting and insulating resin 74 be made of urethane acrylate type resin or epoxy acrylate type resin.

In the image sensor K7, the lower face of the transparent film substrate 77c is brought into close contact with an original document 70 and the original document 70 is illuminated from above by a LED array 79 through a slit formed by the semiconductor image sensor chip 71 and the light shielding layer 71b, the transparent protective layer 76, the transparent photo-setting and insulating resin 74 and the transparent film substrate 77c. Then, optical data from the original document 70 is directly fed to the photosensor array 72 through the transparent film substrate 77c and the transparent photo-setting and insulating resin 74 such that information of the original document is read.

Not only optical data from the original document 70 can be read by the image sensor K7 without the need for providing a lens system and without optical crosstalk by the light shielding layer 77d at high resolution in which an MTF has a value of 50% for a chart having 4 line pairs/mm but the image sensor K7 itself can be remarkably reduced in size.

When the light shielding layer 77d is made electrically conductive so as to have a sheet resistance of not more than $10^5$ Ω/□, static electricity produced through direct contact of the original document 70 with the transparent film substrate 77c can be eliminated and noises can be lessened. Furthermore, optical transmission efficiency of the image sensor K7 is 4 to 5 times that of a known arrangement employing a lens system, thereby resulting in reduction of cost of the light source 79.

What is claimed is:

1. A direct contact type image sensor comprising:

an optical fiber array plate having an upper face and a lower face to be directed toward an original document, said optical fiber array plate including a transparent substrate and an optical fiber array fused in said transparent substrate;

said optical fiber array being formed by at least a plurality of optical fibers arranged in a row, each said optical fiber including a center core, a clad surrounding said core and an optical absorber coated around said clad;

a semiconductor image sensor chip including a photosensor array and mounted on said upper face of said optical fiber array plate through transparent photo-sensitive and insulating resin, such that said photosensor array is optically connected to a lower face of said optical fiber array through said optical fiber array;

a circuit conductive layer formed on an upper face of said transparent substrate;

a bump electrode formed on a lower face of said semiconductor image sensor chip and in contact with said circuit conductive layer;

a light source for illuminating an original document;

said optical fiber array plate having on said upper face thereof a slit for allowing light from said light source to pass therethrough;

a first light shielding layer provided on all portions of said lower face of said optical fiber array plate other than a portion thereof corresponding to said optical fiber array;

a second light shielding layer provided on all portions of said upper face of said optical fiber array plate other than portions thereof corresponding to said optical fiber array and said slit; and means for preventing the light from said light source from being reflected on said lower face of said optical fiber array and thereby for ensuring that the light from said light source reaches the original document through said lower face of said optical fiber array, said preventing means comprising a transparent resinous layer provided on the entire said lower face of said optical fiber array and on a lower face of said first light shielding layer so as to be brought into close contact with the original document.

2. A direct contact type image sensor as claimed in claim 1, wherein said transparent resinous layer has a refractive index equal to that of said core of each of said optical fibers.

3. A direct contact type image sensor as claimed in claim 1, wherein said transparent resinous layer and said first light shielding layer have a pencil lead hardness of not less than 3 H.

4. A direct contact type image sensor as claimed in claim 1, further comprising a third light shielding layer entirely covering side faces of said optical fiber array plate.

5. A direct contact type image sensor as claimed in claim 1, wherein said circuit conductive layer is formed by a thick film printing method.

6. A direct contact type image sensor as claimed in claim 1, wherein said circuit conductive layer is formed by a thin film printing method.

7. A direct contact type image sensor as claimed in claim 1, wherein said circuit conductive layer comprises a flexible circuit conductive substrate.

8. A direct contact image sensor as claimed in claim 7, wherein said flexible circuit conductive substrate is bonded to said optical fiber array plate by a transparent insulating resin.

9. A direct contact type image sensor as claimed in claim 7, wherein said bump electrode has a height of not more than 100 $\mu$m.

10. A direct contact type image sensor as claimed in claim 1, wherein said light source is disposed above said upper face of said optical fiber array plate, and light from said light source is incident on said core from said optical absorber through said clad so as to be irradiated to the original document through said optical fiber array.

11. A direct contact type image sensor as claimed in claim 10, further comprising a transport roller for feeding the original document to a read-out position of a reader such that light reflected from the original document illuminated by said light source is guided to said photosensor array and converted thereby into an electrical signal, thereby reading an image on the original document, said transport roller being made of electrically conductive rubber having a sheet resistance of not more than $10^7$ $\Omega/\square$.

12. An optical fiber array plate comprising:

a transparent substrate;

an optical fiber array fused in said transparent substrate, said optical fiber array comprising a plurality of optical fibers arranged in a row, each said optical fiber including a center core, a clad surrounding said core, and an optical absorber coated around said clad and extending throughout a length of said optical fiber; and at least all portions of said transparent substrate in contact with said optical fibers throughout said length thereof comprising light shielding absorbing material, thereby forming means both to shield said optical fiber array from external light and to absorb flare light in said optical fiber array.

13. A direct contact type image sensor comprising:

an optical fiber array plate including a transparent substrate and an optical fiber array fused in said transparent substrate;

said optical fiber array being formed by at least a plurality of optical fibers arranged in a row, each said optical fiber including a center core, a clad surrounding said core, and an optical absorber coated around said clad and extending throughout a length of said optical fiber;

at least all portions of said transparent substrate in contact with said optical fibers throughout said length thereof comprising light shielding absorbing material, thereby forming means both to shield said optical fiber array from external light and to absorb flare light in said optical fiber array; and a semiconductor image sensor chip including a photosensor array and bonded to said optical fiber array.

14. A direct contact type image sensor comprising:

a transparent film substrate having an upper face and a lower face to be directed toward an original document;

a circuit conductive layer formed on said upper face of said transparent film substrate;

a semiconductor image sensor chip including a photosensor array and mounted on said upper face of said transparent film substrate by transparent photo-setting and insulating resin;

a bump electrode formed on a lower face of said semiconductor image sensor and in contact with said circuit conductive layer;

a first light shielding layer formed on all portions of said lower face of said transparent film substrate other than a portion thereof that corresponds to said photosensor array;

a light source for illuminating the original document;

said transparent film substrate having on said upper face thereof a slit for allowing light from said light source to pass therethrough;

a second light shielding layer formed on all portions of said upper face of said transparent film substrate other than portions thereof corresponding to said photosensor array and said slit; and a transparent resinous layer entirely covering said lower face of said portion of said transparent film substrate and a lower face of said first light shielding layer.

15. A direct contact type image sensor as claimed in claim 14, wherein said first light shielding layer and said transparent resinous layer have a pencil lead hardness of not less than 3 H.

16. A direct contact type image sensor as claimed in claim 14, wherein said transparent resinous layer is made of electrically conductive material.

17. A direct contact type image sensor as claimed in claim 16, wherein said electrically conductive material of said transparent resinous layer has a sheet resistance of not more than $10^5$ $\Omega/\square$.

18. A direct contact type image sensor as claimed in claim 14, wherein said first light shielding layer is made of electrically conductive material.

19. A direct contact type image sensor as claimed in claim 18, wherein said electrically conductive material of said first light shielding layer has a sheet resistance of not more than $10^5$ $\Omega/\square$.

* * * * *